June 28, 1927.  1,633,731
F. K. FISH, JR
PROCESS FOR TREATING PLANT MATERIAL
Filed July 11, 1925
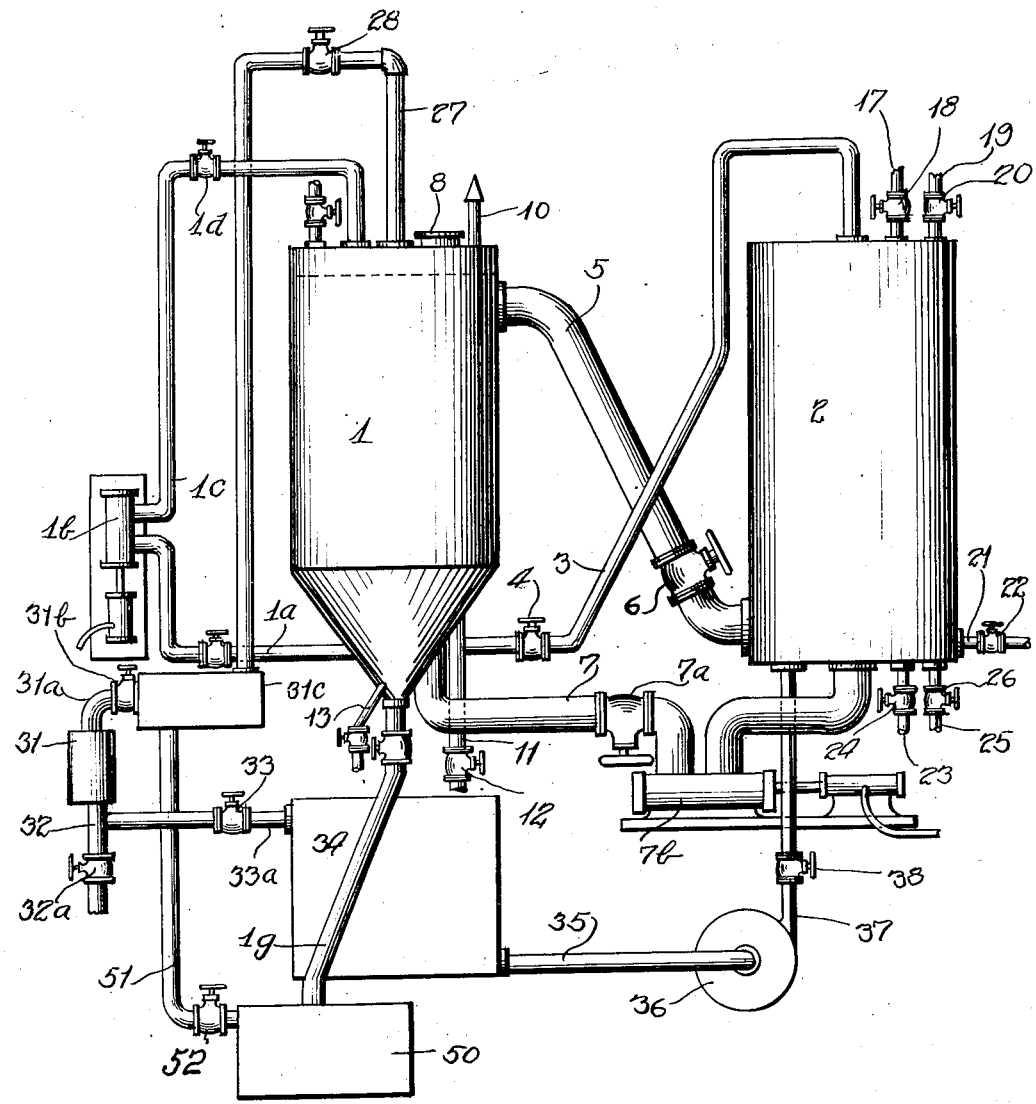
INVENTOR.
F. K. Fish, Jr.
BY
ATTORNEYS.

Patented June 28, 1927.

1,633,731

UNITED STATES PATENT OFFICE.

FREDERICK K. FISH, JR., OF SAN FRANCISCO, CALIFORNIA.

PROCESS FOR TREATING PLANT MATERIAL.

Application filed July 11, 1925, Serial No. 42,961, and in Canada December 20, 1924.

This invention relates to improvements in a process for treating plant material containing cellulosic substance, such for instance, as wood, lumber, pulp stock and other fibrous substances, and preparing such material for commercial uses.

One of the objects of the invention is to provide a process for quickly and economically treating fibrous material with a liquor initially charged with an alkali and solvent extractives from a substance or material, similar to that being treated, or solvent extractives from such treated material, to soften, attack and otherwise act on the constituents of the material under treatment, other than the contained cellulose, without weakening or dissolving said cellulose.

It is well recognized in this art that chemicals of the alkali class, when mixed with water under pressure and high temperature, act favorably upon the lignin or other encrusting matters of wood fiber, and that complex molecules are broken down. It is also well recognized that a reaction takes place by this treatment, wherein acids and insoluble tar like substances are formed, thus discoloring the fiber of the product.

Taking advantage of the use of alkalis in the treatment of plant material, as far as it is known to me, I propose by my present invention to initially charge the treating liquor with an alkali or like reagent and solvent extractives from plant material, to form a new and more effective liquor to act upon the plant material under low temperature, and to so cause a penetration of the liquor into the innermost cellular structure of the plant material to ensure effective removal therefrom of constituents, such for instance as the objectionable resins and other objectionable reaction products. I accomplish this action without in any way impairing the fiber content, and thereby improve the substance for commercial use.

I have found from practical use that by treating plant material in liquor charged with the solvent extractives from plant material similar to the material being treated, and an alkali, and preventing the liquor and volatile solvent extractives and the plant material contacting with the atmosphere, that a chemical action or re-action is brought about, so that when the material is impregnated with the initially charged liquor, in a zone charged with the liquor or the extractives thereof, the action produces a high grade product. By my improved process, the objectionable products are removed from the material.

A further object of this invention is to provide a process for treating plant material, wherein the various steps, and character of liquor employed in treating the material, produces a product lighter in color than has heretofore been possible without subsequently subjecting the product to a strong bleaching liquor.

A still further object of this invention is to provide a process wherein the treating liquor is initially charged with an alkali and solvent extractives of plant material, and after use on the treated material the liquor is preserved, without contact with the atmosphere, and is used in subsequent treatment of a charge of plant material, said liquor being stronger in solvent extractives than the initially charged liquor first used.

Other objects and advantages will appear from the specific description in the specification, and particularly pointed out in the claims.

In order to obtain a comprehensive understanding of my invention, reference is made to the accompanying drawing, which illustrates diagrammatically one form of apparatus for carrying out the process.

It may be stated that the term "initially charged" as used in this application is intended to distinguish the liquor employed from liquor in which an alkali is used in wood treating processes, but is free of solvent extractives at the time said liquor is introduced to the material being treated. In other words "initially charged" as herein used means that the liquor before actual treatment on the material commences, contains an alkali and solvent extractives of plant substance.

Solvent extractives as used throughout this application means substances removed or liberated from the plant material by means of the particular digesting operation and at the temperature employed therein. These extractives may be in the form of gases or vapour and may be in solution or absorption in the liquor. Thus, alkali is a solvent but not a solvent extractive as used herein. Thus a distinction between solvent extractives and chemical re-agents as used will be apparent.

In the drawings, 1 illustrates a tank to receive the plant material to be treated, which may be wood, lumber, chips or any other fibrous material containing cellulose. Suitably spaced from the tank 1, is a tank 2, in which the treating liquor is stored and pre-heated before being introduced to tank 1. A pipe 3, connects the bottom of the tank 1, with the top of the tank 2, a valve 4, being provided to regulate the flow of fluid or volatile extractives and the like, from tank 2 to tank 1. A pipe 5, communicates with the tank 1, at or about the level of the liquor in tank 1, when the plant material is submerged, the other end of the pipe communicating with the lower portion of tank 2, a valve 6 being provided to control the flow of substances through the pipe to tank 2.

Communicating with bottom of tank 1 is a pipe 7, which also communicates with the bottom of the tank 2, a valve 7$^a$ in the pipe, controlling the flow of liquor between the two tanks. In this pipe is a double acting pump 7$^b$, to force liquor from one tank to the other.

At the top of tank 1, is a closure 8, for sealing the inlet through which the plant material to be treated is passed and adjacent thereto is a relief valve 10. Extending from the bottom of tank 1, is a drain pipe 11, provided with a valve 12, and adjacent thereto is a steam pipe 13, having a valve 14, for introducing steam to the liquor in the tank 1, when carrying out the process.

Communicating with the top of tank 2, is a steam pipe 17, having a valve 18, and adjacent thereto is a pressure release pipe 19, provided with a valve 20. The bottom of the tank 2, is provided with a pipe 21, and a valve 22, to charge the tank with liquor, and in said bottom is a draw-off pipe 23, provided with a valve 24, and a steam pipe 25, having a valve 26.

Communicating with the top of tank 1, is a pipe 27, having a valve 28, the pipe leading to a condenser 31$^c$ from the opposite side of which leads a pipe 31$^a$ having a valve 31$^b$. The pipe 31$^a$ connects with the suction end of vacuum pump 31 from the exhaust side of which leads a pipe 32, provided with a valve 32$^a$. Leading from the pipe 32 is a pipe 33$^a$, having a valve 33, the pipe communicating with a tank 34. Extending from the tank 34, is a pipe line 35, leading to a pump 36 from the opposite side of which leads a pipe 37, having a valve 38, the pipe 37 being connected with the bottom of tank 2.

Communicating with the bottom of tank 1, is a pipe 1$^a$ which leads to a circulating pump 1$^b$ and from the opposite side of the pump leads a pipe 1$^c$, having a valve 1$^d$, this pipe communicating with the top of tank 1.

Extending from the bottom of the tank 1 is a valved pipe 1$^g$, leading to a blow pit 50. From the top of the blow pit leads a pipe 51, having a valve 52, pipe 51 leading to the condenser 31$^c$.

In carrying out my improved process, liquor is introduced to tank 2 through pipe 21. This liquor comprises water and an alkali, such for instance as sodium carbonate, lime and caustic potash or the like, and solvent extractives of plant material, such for instance as the terpenes and other lighter and heavier oils. The liquor is initially charged with an alkali to cooperate with the solvent extractives, to bring about the desired action on the fibrous material being treated. After the liquor treatment is completed, the liquor is reused, but since a certain amount of its alkali content has been used in the treatment on the wood, it is again strengthened by adding alkali for the subsequent treatment.

When liquor is introduced into tank 2, steam is admitted through pipe 25, and the liquor is heated to the desired degree say to or about 274° F. and a pressure of about 30 lbs. is produced. Before charging the tank 1 with material to be treated, a sufficient quantity of alkali is introduced in the bottom of said tank. Then the material to be treated is run into the tank and valve 7$^a$ is partially opened to admit sufficient liquor from tank 2, to allow of saturation of the material to be treated, and simultaneously valve 4, is partially opened to admit volatile extractives and alkali vapors into the liquor in the bottom of tank 1, in sufficient amount to maintain the desired temperature of the material and liquor in said tank 1, care being taken to regulate the heat so as to avoid raising the temperature above 150° F. Pump 1$^b$ is started and the charge of liquor is pumped through pipe 1$^c$ to the top of the tank and continuously sprays the liquor of the material, while the tank is being filled with said material. The pump circulates and sprays the liquor in the tank, which penetrates and saturates the material and raises the temperature of the entire mass all material in the digester. When the desired amount of material has been fed to the tank, the closure 8 is put in place and sealed. Valve 33 is closed and valves 28, 31$^b$ and 32$^a$ are opened, and vacuum pump 31 is started to exhaust the air from tank 1, to the atmosphere through pipe 27, condenser 31$^c$, pipes 31$^a$ and 32, thus forming a vacuum of about 15 or 20 inches in the digester.

The vacuum withdraws the air from around the plant material and from the interior of said material, to render the interior more susceptible to the penetration of the liquor, even the innermost cells of the individual pieces. The vacuum is maintained for such length of time as may be found desirable, this depending upon the physical characteristics of the plant material, and the nature of the treatment the material is to be subjected.

During the time the vacuum is maintained, the pump 1<sup>b</sup> operates to continue the circulating action of the liquor. This circulation of the liquor in spray form, while the vacuum is on, insures the cellular structure of the material being further saturated with the alkali and solvent extractives, which produces in effect a bleaching action. While the vacuum is on, valve 4 is kept open for continued admission of the volatile extractives to the liquor in the bottom of tank 1.

When the material becomes thoroughly saturated, the vacuum pump is stopped, and valves 28 and 32<sup>a</sup>, are closed, and valve 4 is opened wide to admit a full charge of the alkali and solvent extractives to tank 1 to bring up the temperature of the material to or about 212° F. The increased charge of alkali and solvent extractives under this higher heat removes resins and inter-cellular binding materials, previously softened and dissolved by the alkali and extractives under low temperature conditions, and a further bleaching action of the fibers is obtained. After the material has been treated at or about 212° F. for thirty minutes, more or less, the temperature in tank 1 is raised to approximately 250° F. and a corresponding pressure of 15 lbs. This step is maintained for ten minutes more or less, and then valve 4 is closed.

During the vacuum period the liquor in tank 2 is heated to the desired degree, and the corresponding pressure raised in said tank, by introducing steam into the bottom, through pipe 25.

Valve 4 having been closed, valve 7<sup>a</sup> is opened and pump 7<sup>b</sup> started and the liquor initially charged with the solvent extractives and alkali in a superheated condition in tank 2, is by reason of the pressure in said tank and the action of the pump 7<sup>b</sup> forced over into tank 1, until the plant material is submerged, the level of the liquor in tank 1 being at about the level of pipe 5.

When the material is submerged in tank 1, its temperature is about 250° F. This temperature, and a pressure of about 15 lbs. is maintained by admitting steam to the tank through pipe 13, and is continued for about thirty (30) minutes more or less to insure of the liquor containing the solvent extractives and alkali, thoroughly impregnating the cells and fibers of the material to act on the constituents associated with the cellulose, without in any way injuring the cellulose and the cellulosic material. To cause the most effective action of the liquor on the material being treated, the operation of the pump 1<sup>b</sup> is continued so that at this period in the process, a superheated liquor is circulated in the tank, which with the high heat and pressure, produces a uniform distribution of the liquor components in and around the material.

The liquor treating step in my process is important, as the previous treatment of the plant material by mixture of the solvent extractives and alkali materially assists the liquor step to accomplish the desired end. Bearing in mind that, previous to this time the plant material has been subjected to the action of the alkali and extractives and liquor under low temperature conditions which distributed the alkali and extractives throughout the cellular structure of the material under treatment, and caused a bleaching action upon the fibers, it will be apparent that the constituents to be removed have therefore to a very large degree, been heated, softened, dissolved and partly removed, and the structure is made ready for the more active treatment of the liquor.

The liquor serves to melt and dissolve resins and remove same from within the plant material; removes tannins and organic matter, which if allowed to remain would cause a tanning effect upon the fibers of the plant material and thereby deteriorate its value; and it also removes mineral salts from the plant material.

The treatment of the plant material by the liquor initially charged with solvent extractives from plant material and an alkali, lightens the color of the plant material being treated, a phenomena which cannot well be explained, but actual demonstration has shown it to be a fact. It is thought that the first subjection of the plant material to the combined action of solvent extractives and alkali at low temperature, materially assists in the accomplishment of this highly important result. It is further believed that with this preliminary treatment, the subsequent treatment of the plant material by the liquor and the differences in temperature surrounding the same, from the time it is placed in the tank to be treated until the treatment is completed, bring about certain unexplained actions and reactions on the material, without affecting the fiber. The light color of the final product is one of the results of this treatment.

During the time the plant material is treated in the liquor, ebullition of the liquor in the tank 1, and the liberation of the constituents from the material being treated, cause certain of these constituents to rise to the top. This layer or surface accumulation on the liquor contains resinous substances, terpenes, and other byproducts liberated from the plant material, which would be detrimental to the final product produced by my process if permitted to come into contact with the atmosphere, and thereafter remain in the liquor or in the material, and yet these byproducts are valuable as extractives for future use, if kept from contact with the atmosphere. Hence after the material is treated with the liquor in the tank 1, valve 6, in pipe 5, is opened, and pressure in tank 1 blows the constituents on top of the liquor and volatile extractives above the liquor, over into the bottom of tank 2, where same are preserved for use on a subsequent charge of plant material. This suddenly reduces the pressure in tank 1, which causes an outward movement of the liquor containing the constituents from the material being treated, pressure in tank 2 at this time being below the pressure in tank 1. Valve 6, is closed and the volatile and other constituents saved from the charge in tank 1, are preserved, without same in anywise coming into contact with the atmosphere and causing oxidation or other deterioration. When valve 6 is closed, valve 7ª is opened and the pump 7ᵇ is started which, with the contained pressure, forces all the liquor from tank 1, through pipe 7 and into the bottom of tank 2, then valve 7ª is closed.

In this transfer of the liquor from one tank to the other, the liberated extractives and the resinous properties are carried over without in anywise coming into contact with the atmosphere, and the original liquor is thereby enriched and preserved for a subsequent treatment, the lighter properties of course rising to the top of the liquor in tank 2.

After the now super-charged liquor has been transferred to tank 2, and valve 7ª closed, valves 28, 31ᵇ, 33 and 38 are opened, and pumps 31 and 36 are started. Pump 31 pulls a vacuum of about 15 inches in tank 1, which will draw moisture, volatile extractives and remaining dissolved constituents from the innermost cells of the plant substance and transfer same to the tank 34, from whence they are transferred into tank 2 by the pump 36, and are preserved to further enrich the liquor in tank 2, to be used in a subsequent treatment, this second vacuum treatment recovers extractives which only become volatile under pressure below atmospheric, such extractives being preserved and intermixed in the liquor for enriching same for future use.

In the development of the art of treating plan substances or plant materials I have coined the term "super-heated water or super-heated liquor" to distinguish from mere cooking or boiling the material at atmospheric pressure. Therefore to let the meaning of this term be understood in connection with the present invention, it may be said that "super-heated" as herein employed defines a temperature and corresponding pressure above the normal boiling point of the liquid and of the solvent constituents of the plant material and alkali when mixed with water. I have found that peculiar beneficial results in the treatment of the material flow from the use of super-heated liquor, and in the present case advantage is taken of these results by super-heating the liquor initially charged with an alkali and solvent extractives of the plant material. In other words practical demonstrations have proven that by super-heating the initially charged liquor, the combined temperature and pressure produces a condition, whether chemical or physical, I am unable to state, that effectually treats the material to remove certain properties and constituents from the material which may be used for subsequent use, without impairing the quality of the fiber. In addition, the liquor and the treatment, instead of discoloring or darkening the product, acts to materially lighten the color which is of tremendous importance in producing a high grade product.

The initially charged liquor, after its first use is enriched to a degree equal to the amount of extractives received from the previous treatment, and as the liquor and extractives are prevented from coming into contact with the air, it will be understood that the values of the solvent extractives is maintained in the liquor when subsequently used. I regard this as important, as the added extractives commingle and intermix with the alkali, and produce a liquor which is highly efficient to extract, dissolve, remove and otherwise treat the plant material without jeopardizing the fibers.

It is to be understood that I only employ alkalis which will so act on the plant material as to bring about the foregoing actions and results, and in no instance will an alkali be employed which will not cooperate with the extractives from the plant material when applying same to the materials with the temperatures employed at the periods of treatment stated. I have found that a fraction of one percent of such alkalis is sufficient to produce the desired results. Care must be taken to refrain from using alkali in such amounts that the fibers will be affected thereby, and care must also be taken to arrest the treatment before fibers of the material become deteriorated.

When the process is completed the treated material may be removed from the digester in any appropriate manner, but if the treated material should have been such as to have reached the stage of pulp, then the valve in pipe 1ᵉ is opened and the pulp is blown into blow pit 50, valves 52, 31, 33 and 38 are opened and vacuum pumps 31 and pump 36 are started. The vapor charged with extractives from the pulp mass is thus drawn from the blow pit, condensed and introduced into the bottom of the tank 2, to enrich the liquor for future use.

From the foregoing description, it will be appreciated that the process described is a decided improvement in the art of treating plant material, as it enables me to commercialize many plant materials which, so far as I am aware, find their way to the waste pile.

What I claim and desire to secure by Letters Patent is:

1. The process of treating plant material comprising impregnating the plant material with heated liquor initially charged with an alkali and volatile and other solvent extractives of plant material to remove from the material being treated solvent extractives and other byproducts of the plant material.

2. The process of treating plant material comprising treating the plant material with a liquor initially charged with an alkali and extractives of plant material while substantially free from atmosphere, to remove from the plant material volatile and other solvent extractives of the plant material and to cause a lightening of the color of said material.

3. The process of treating plant material comprising treating the plant material with heated vapors initially charged with an alkali and extractives from plant material to preliminarily soften the fibrous structure, and subsequently treating the preliminarily treated plant material with liquor which dissolves and removes the solvent extractives of plant material.

4. The process of lightening the color of plant material when solvent extractives are substantially removed, comprising treating the plant material to the action of an alkali and volatile and other solvent extractives of plant material.

5. The process of treating plant material, comprising applying to the plant material super-heated solvents initially charged with an alkali and volatile and other solvent extractives of plant material to raise the temperature of the plant material and soften the fibrous structure thereof.

6. The process of treating plant material comprising impregnating the plant material with heated liquor initially charged with an alkali and volatile and other solvent extractives of plant material to remove from the material being treated solvent extractives and other by-products of the plant material, and removing vapors and solvent extractives liberated from the plant material accumulated on or at the surface of the liquor above the material.

7. The process of treating plant material consisting in saturating the plant material in heated liquor initially charged with an alkali and volatile and other solvent extractives from plant material, and thereafter removing such charged liquor from the plant material, and then subjecting the plant material to a vacuum.

8. The process of treating plant material comprising removing air therefrom and while substantially free of air, applying to such plant material solvents initially charged with an alkali and volatile and other solvent extractives of plant material, then applying to the plant material under treatment liquor initially charged with an alkali and volatile and other solvent extractives of plant material, then prior to the removal of the liquor from around the plant material under treatment, removing volatile extractives and resinous properties accumulated above the plant material under treatment, then removing the liquor from around the plant material, then subjecting the plant material to a vacuum.

9. The process of treating plant material comprising subjecting the plant material to a vacuum, and while the vacuum is on, treating the material with heated vapors charged with volatile solvent extractives of plant material and an alkali.

10. The process of treating plant material, comprising treating the plant material in a zone, initially charged with heated volatile and other solvent extractives of plant material and an alkali, to remove solvent extractives and other constituents from the plant material, and arresting the treatment before deterioration of the fibers of the material.

11. The process of treating plant material comprising treating the plant material in a vacuum zone initially charged with heated volatile and other solvent extractives of plant material and an alkali to remove solvent extractives and other constituents from the plant material, and arresting the treatment before deterioration of the fibres of the material.

12. The process of treating plant material comprising treating the plant material with super-heated liquor previously used in a like treatment and charged with an alkali and volatile and other solvent extractives of plant material and having been preserved free of contact with the air since its previous use and strengthened by adding alkali, arresting the treatment by removing the liquor from around the material, and then reducing the pressure in and around the material to dissolve and remove solvent extractives from the plant material.

13. The process of treating plant material comprising spraying the plant material with liquor previously used in a like treatment and charged with an alkali and volatile and other solvent extractives of plant material and having been preserved free of contact with the air since its previous use and strengthened by adding alkali to dissolve and remove solvent extractives from the plant material.

14. The process of treating plant material comprising spraying the plant material with liquor previously used in a like treatment and charged with an alkali and volatile and other solvent extractives of plant material and having been preserved free of contact with the air since its previous use and strengthened by adding alkali, at a temperature below the normal boiling point and then submerging the plant material in like liquor and maintaining a temperature in excess of the normal boiling point and a corresponding pressure to dissolve and remove solvent extractives from the plant material.

15. The process of treating plant material comprising spraying the plant material with liquor previously used in a like treatment and charged with an alkali and volatile and other solvent extractives of plant material and having been preserved free of contact with the air since its previous use and strengthened by adding alkali while feeding the material to be treated at or about atmospheric pressure, continuing the treatment with a pressure below atmospheric and at a temperature below the normal boiling point and then submerging the plant material in like liquor and maintaining a temperature in excess of the normal boiling point and a corresponding pressure to dissolve and remove solvent extractives from the plant material.

16. The process of treating plant substance, consisting in circulating in and around the plant material liquor previously used in a like treatment and charged with an alkali and volatile and other solvent extractives of plant material and having been preserved free of contact with the air since its previous use and strengthened by adding alkali, maintaining a temperature in and around the material below the normal boiling point of the liquor, and subsequently submerging the plant material in the liquor while same is maintained at a temperature in excess of the normal boiling point of the liquor and at a corresponding pressure to dissolve and remove solvent extractives from the plant material.

17. The process of treating plant substances consisting in circulating in spray form in and around the plant material, liquor previously used in a like treatment and charged with an alkali and solvent extractives of plant material and having been preserved free of contact with the air since its previous use and strengthened by adding alkali and while circulating the liquor maintaining a vacuum, destroying the vacuum by introducing further heated like liquor and submerging the material and continuing the circulation of the liquor.

18. The process of treating plant substance consisting in submerging the material to be treated in super-heated liquor previously used in a like treatment and charged with an alkali and volatile and other solvent extractives of plant material and having been preserved free of contact with the air since its previous use and strengthened by adding alkali, and circulating the liquor while under pressure.

19. The process of treating plant substance consisting in circulating in and around the plant material liquor previously used in a like treatment and charged with an alkali and volatile and other solvent extractives of plant material and having been preserved free of contact with the air since its previous use and strengthened by adding alkali, circulating the liquor in and around the material at one period of the treatment at a low temperature and subsequently at a temperature above the boiling point of the liquid and under pressure.

20. The process of treating plant substance consisting in treating the plant material to the action of liquor previously used in a like treatment and charged with an alkali and volatile and other solvent extractives of plant material and having been preserved free of contact with the air since its previous use and strengthened by adding alkali, maintaining a temperature in and around the material below the normal boiling point of the liquor, and subsequently submerging the plant material in the liquor while same is maintained at a temperature in excess of the normal boiling point of the liquor and at a corresponding pressure to dissolve and remove solvent extractives from the plant material.

21. The process of treating plant material for the manufacture of pulp, comprising removing air from the material being treated, applying to the material under treatment while substantially free from air, heated vapor charged with an alkali or like reagent and solvents of plant material, the treatment preventing oxidation of the material and softening the fibers and removing solvent extractives from said material.

22. The process of treating plant material which consists in charging the material into a digester, while withdrawing liquor from the bottom of the digester and spraying same in the top to saturate the said materials, applying suction to the material to remove air from the complete charge during the continuous operations of the spray and then raising the pressure in the digester while continuing the spraying of liquor on the charge.

23. The process of making pulp, the step which consists in recovering volatile solvent extractives from a blow pit and incorporating same in a treating liquor in which the material is treated.

24. A three stage process of treating plant material which consists in charging the material into a digester containing liquor, removing air from said charge and finally treating the charge with a further supply of liquor, wherein during each stage liquor is withdrawn from the bottom of the digester and sprayed on top of the charge therein.

25. A process as defined in claim 24 wherein the liquor during the first stage is relatively strong in an added alkali.

26. A process as defined in claim 24 wherein the liquor during the first stage is relatively strong in alkali and is charged with volatile solvent extractives of the plant materials.

27. A process as defined in claim 24 wherein the liquor during the third stage is enriched with additional alkali and contains volatile and other solvent extractives of the plant materials.

28. An apparatus for treating plant material having in combination with a closed tank a blow-pit and a liquor supply tank, a condenser connected with said blow-pit and adapted to recover the volatile solvent extractives evolved from the charge in the blow-pit and discharge the same into said liquor supply tank, means for creating a vacuum in said closed tank and means for withdrawing liquor from the bottom of the closed tank and spraying the same on the top of the charge in the said tank.

29. The process of treating fibrous material consisting in cooking said fibrous material in digesting liquor under pressure in a digester, suddenly reducing the pressure of the digesting liquor to or about that of the atmosphere by releasing fluid from a space in the upper portion of the digester above the body of liquor to a liquor tank, transferring liquor from the lower portion of the digester to said liquor tank, removing the treated fibrous material to a blow pit, and collecting the extractives evolved from the treated material and returning same to the tank.

30. The process of making pulp from plant material comprising cooking the material in liquor which has been used in a previous cook and preserved free of atmosphere, which has been strengthened in volatile and other solvent extractives and alkali and is super-heated at the time it is introduced to the material.

31. The process of making pulp comprising cooking the material in liquor which has been used in a previous cook, and thereafter preserved free of the atmosphere and which has been strengthened in volatile and other solvent extractives and alkali and is in a super-heated condition at the time it is introduced to the material.

32. The process of making pulp from plant material comprising cooking the material in liquor which has been used in a previous cook and which has been strengthened in volatile and other solvent extractives and alkali and is super-heated at the time it is introduced to the material.

33. The process of making pulp comprising cooking the material in liquor which has been used in a previous cook, and thereafter preserved free of the atmosphere and which substantially retains its heat and which has been strengthened in volatile and other solvent extractives and alkali and super-heated at the time it is introduced to the material.

34. In a pulp producing process, the step which consists in preserving all the volatile and other solvent extractives produced in the digester and evolved from and contained in the treating liquor for further use in the process.

35. In a pulp producing process the step which consists in injecting into the material to be treated super-heated vapors charged with volatile extractives from said material.

36. In a pulp producing apparatus a digester in combination with means for skimming the digester after a cooking operation, and means for independently removing treated liquor containing solvent extractives and gases or vapors containing volatile extractives.

In testimony whereof I affix my signature.

FREDERICK K. FISH, Jr.